United States Patent
Brandt et al.

(10) Patent No.: US 6,808,193 B2
(45) Date of Patent: Oct. 26, 2004

(54) WHEEL SUSPENSION

(75) Inventors: Robert Brandt, Attendorn (DE);
Vladimir Kobelev, Attendorn (DE);
Michael Lebioda, Dermsdorf (DE);
Jorg Neubrand, Freudenberg (DE)

(73) Assignee: Muhr und Bender, Attendorn (DE)

(*) Notice: Subject to any disclaimer, the term of this patent is extended or adjusted under 35 U.S.C. 154(b) by 0 days.

(21) Appl. No.: 10/146,053

(22) Filed: May 16, 2002

(65) Prior Publication Data
US 2002/0175488 A1 Nov. 28, 2002

(30) Foreign Application Priority Data
May 23, 2001 (DE) .......................... 101 25 503

(51) Int. Cl.$^7$ .............................. B60G 11/14
(52) U.S. Cl. .................. 280/124.179; 280/124.154; 280/124.146
(58) Field of Search .................. 280/124.179, 124.154, 280/124.146

(56) References Cited

U.S. PATENT DOCUMENTS

| | | | | |
|---|---|---|---|---|
| 2,942,815 A | * | 6/1960 | Schwenk et al. | 244/137.1 |
| 2,992,015 A | * | 7/1961 | Halford et al. | 280/124.146 |
| 3,490,785 A | * | 1/1970 | Moss | 280/124.146 |
| 4,903,985 A | | 2/1990 | Muhr et al. | |
| 5,052,664 A | * | 10/1991 | Lesher et al. | 267/167 |
| 6,199,882 B1 | * | 3/2001 | Imaizumi et al. | 280/124.146 |
| 6,328,290 B1 | * | 12/2001 | Imaizumi et al. | 267/28 |
| 6,375,174 B2 | * | 4/2002 | Hasegawa et al. | 267/167 |
| 6,460,840 B2 | * | 10/2002 | Imaizumi et al. | 267/286 |
| 6,481,701 B2 | * | 11/2002 | Kessen et al. | 267/166 |
| 6,543,757 B2 | * | 4/2003 | Imaizumi | 267/179 |

FOREIGN PATENT DOCUMENTS

| | | |
|---|---|---|
| DE | 1 505 616 | 7/1970 |
| DE | 37 43 450 C2 | 2/1990 |
| EP | 0 319 651 B1 | 6/1989 |
| GB | 1198713 | 7/1970 |
| WO | WO 01/56819 A1 | 8/2001 |

* cited by examiner

Primary Examiner—Michael J. Carone
Assistant Examiner—M Thomson
(74) Attorney, Agent, or Firm—Nixon Peabody LLP; David S. Safran

(57) ABSTRACT

A wheel suspension with a wheel-guiding strut in provided which includes a helical compression spring, a shock absorber, and a suspension arm, and which is connected to a body and to a wheel. The helical compression spring is preferably made such that it at least partially compensates for transverse forces on the shock absorber or on the piston rod of the shock absorber. Provisions are made for reducing or minimizing or eliminating the force which is delivered to the steering mechanism and which results from the difference between the components of the helical compression spring forces $F_F$ acting in the direction of travel, and thus the reaction forces $R_F$, on the left and right sides of the vehicle. These provisions include making the helical compression spring such that the line of action of the spring force runs skewed to the center line of the shock absorber and the spring center line of the helical compression spring in the unloaded state is roughly or generally S-shaped in one plane and roughly or generally C-shaped in another plane.

2 Claims, 4 Drawing Sheets

WHEEL SUSPENSION

BACKGROUND OF THE INVENTION

1. Field of the Invention

The invention relates to a wheel suspension with a wheel-guiding strut which has a helical compression spring, a suspension arm, and a shock absorber, and which is connected on the one hand to the body and on the other to the wheel, wherein the helical compression spring is preferably made such that it at least partially compensates for reaction forces on the shock absorber.

2. Description of the Related Art

In wheel suspensions of the type fundamentally under consideration here, often also called a MacPherson wheel suspension, the upper suspension arm which is present in otherwise conventional wheel suspensions is replaced by a long-stroke strut (see Lueger *Lexikon der Technik*, vol. 12 *Lexikon der Fahrzeugtechnik*, 1967 Deutsche Verlags-Anstalt GmbH, page 425).

In wheel suspensions of the type underlying the invention, the helical compression spring can be located concentrically to the axis of the shock absorber. Here the entire reaction force, which occurs on the upper support point and therefore on the body, must be accommodated by the piston rod of the shock absorber. This creates considerable friction forces on the piston of the shock absorber and results in bucking spring deflection and rebound.

To reduce the reaction forces acting on the piston rod of the shock absorber, the helical compression spring has traditionally been installed in the strut such that the line of action of the spring force of the helical compression spring forms an acute angle with the shock absorber axis. Ideally, the angle between the line of action of the spring force of the helical compression spring and the shock absorber axis would have to correspond to the angle between the line of supporting action and the shock absorber axis. Therefore, in the normally loaded state, the piston rod of the shock absorber would be largely free of reaction forces. Reaction forces would only occur during the normally loaded state in the event of spring deflection or rebound. However, the angle between the line of action of the spring force of the helical compression spring and the shock absorber axis generally can only be smaller than the angle between the line of supporting action and the shock absorber axis, since the shock absorber axis must be able to pass through the helical compression spring and the wheel must have sufficient freedom of motion.

Due to the continuous widening of the tires and the associated displacement of the wheel rise point to the outside, increased angles necessarily occur between the line of supporting action and the shock absorber axis, thereby preventing the preferred arrangement described above from eliminating reaction forces on the piston rod.

For these reasons, the helical compression spring cannot be set as obliquely with reference to the shock absorber axis as would be desirable. Therefore, the line of action of the spring force is shifted relative to the center line of the spring by slanting one or both of the end turns, by thickening the end turns, by slanting the spring plate, or by combinations of the aforementioned measures. This results in the line of action of the spring force on the lower end of the helical compression spring being farther to the outside than the center line of the spring while the line of action of the spring force and the center line of the spring on the upper end of the helical compression spring passes through the support point.

Since the attainable angle between the line of action of the spring force and the shock absorber axis is still too large to eliminate the reaction forces on the piston rod of the shock absorber, the helical compression spring has been configured such that it compensates at least partially for the reaction forces which occur on the shock absorber. German patent 1 505 616 discloses a wheel suspension of the type under consideration with a helical compression spring with a spring center line in the unloaded state which is roughly C-shaped. Furthermore, German patent 37 43 450 (which corresponds to U.S. Pat. No. 4,903,985) and European patent 0 319 651 disclose a wheel suspension of the type under consideration with a helical compression spring with a spring center line in the unloaded state which is roughly S-shaped.

More specifically, German patent 37 43 450 and U.S. Pat. No. 4,903,985 describe the aforementioned problem of reaction forces acting on the shock absorber or on the piston rod of the shock absorber. German patent 37 43 450 and U.S. Pat. No. 4,903,985 also disclose a helical compression spring with a roughly C-shaped spring center line in the unloaded state. Moreover, German patent 37 43 450 and U.S. Pat. No. 4,903,985 disclose a helical compression spring with a roughly S-shaped spring center line in the unloaded state. Wheel suspensions which use the teaching of German patent 37 43 450 and U.S. Pat. No. 4,903,985 and which also have a helical compression spring with a roughly S-shaped spring center line in the unloaded state have already proven themselves millions of times and are becoming increasingly important.

It was stated initially that the invention relates to a wheel suspension which includes a helical compression spring which is configured such that it at least partially compensates for reaction forces which occur on the shock absorber. The helical compression spring may be of the types described above including the helical compression spring with a roughly C-shaped or S-shaped spring center line in the unloaded state. On one hand, in helical compression springs, the spring center lines are of course not physically present; only the individual spring turns or only the totality of the spring turns are physically present. On the other hand, there is no known definition for the spring center lines of helical compression springs. Therefore it will be described below how the spring center lines of helical compression springs can be determined and what is needed when referencing the spring center lines of helical compression springs.

One process for determining the spring center lines of helical compression springs is to first construct the envelop jacket of the helical compression spring and then equate the center line of the envelop jacket to the center line of the spring. This process can be used at best to a limited degree; it fails especially wherever there are spring turns with a changing turn diameter. Another process for determining the spring center line of helical compression springs is characterized in that the center points of the spring turns are determined from the arithmetic mean of the turn points and that the connection of the center points of the spring turns determined in this way represents the center line of the spring. Finally, the spring center line of the helical compression springs can be determined by the projections of the individual spring turns being examined in one plane, by the center point of each spring turn being assumed to be the center point of a circle which has approached the spring turn, and by the center points of the spring turns which have been obtained in this way being connected to one another.

When reference is made to the spring center lines of the helical compression springs, what matters is the importance of the spring center lines for the lines of action of the spring force of the helical compression springs. If a helical compression spring has a straight spring center line, the line of action of the spring force which is of course always a straight line coincides with the center line of the spring. In a helical compression spring with a roughly C-shaped spring center line in the unloaded state, the line of action of the spring force when in the installed state is shifted relative to the center line of the spring, which runs straight in the installed state (compare FIG. 5 of German patent 37 43 450). Conversely, for a helical compression spring with a roughly S-shaped spring center line in the unloaded state, it applies that in the installed state the line of action of the spring force runs at an acute angle to the spring center line, which runs straight in the installed state (compare FIG. 6 of German patent 37 43 450).

Otherwise reference is made to the following:

With consideration of what was stated above with reference to the lines of action of the spring force of the helical compression springs, there is also a roughly C-shaped spring center line when the end turns of the helical compression springs are tilted in opposite directions and the middle part of the helical compression spring however runs in a straight line (compare the helical compression spring as shown in FIG. 2 of German patent 1 505 616, which has the same action as the helical compression spring in FIG. 3). What can be achieved with a helical compression spring with a roughly S-shaped spring center line in the unloaded state can also be achieved by the end turns of the helical compression spring being tilted in opposite directions when the spring center line runs in a straight line. Finally, what can be achieved with a helical compression spring with a roughly S-shaped spring center line in the unloaded state can also be achieved by a helical compression spring which has a partially roughly C-shapes spring center line and also has an end turn which is remote from the C-shaped part and which is tilted in the opposite direction.

Another problem with wheel suspensions of the type under consideration is that the forces and moments acting in the system specifically cause additional loading on the steering mechanism which has a destabilizing effect for the steering mechanism due to the elasticity of the system.

In the system under consideration here the following act as forces:

a) the wheel rise force which runs in the direction perpendicular to the plane of the wheel rise,
b) the force of the transversal swinging arm, which runs in the plane of the suspension arm and passes through the lower bearing point, and
c) the helical compression spring force which should lie in the main loading plane, which is determined by the upper bearing point, by the lower bearing point, and by the wheel rise point.

If the helical compression spring force is not in the main loading plane, a reaction force forms in the direction of travel. If the suspension arm were perfectly rigid, the component of the helical compression spring force acting in the direction of travel would be captured by the suspension arm. In reality, the wheel suspension is completely elastic, and the suspension arm and the steering mechanism are deformable. The component of the helical compression spring force acting in the direction of travel is therefore only partially captured by the suspension arm; the force also partially acts on the steering mechanism.

Conventionally, the drive forces on the left and right sides of the vehicle are the same size, while the reaction forces, therefore the components of the helical compression spring force acting in the direction of travel, are usually different on the two sides of the vehicle. The difference between the components of the helical compression spring forces acting in the direction of travel on the left side of the vehicle and on the right side of the vehicle can be explained with a different tilt of the line of action of the spring force as a result of wobbling of the helical compression spring forces. The difference between the components of the helical compression spring forces acting in the direction of travel on the left side of the vehicle and on the right side of the vehicle contributes to the fact that in the steering mechanism, an undesirable destabilizing steering moment is formed. Under the action of this destabilizing steering moment, the vehicles wanders on one side from driving in a straight line.

SUMMARY OF THE INVENTION

The object of the invention is to provide a wheel suspension for reducing or minimizing the force which is delivered to the steering mechanism and which results from the difference between the components of the helical compression spring forces acting in the direction of travel on the left side of the vehicle and the right side of the vehicle.

The above object and other objects are achieved by providing a wheel suspension including a helical compression spring made such that the line of action of the spring force runs skewed to the center line of the shock absorber. In this regard, the following applies; vertical planes which run perpendicular to the lengthwise direction of the vehicle are referred to as the XZ planes and the vertical planes which run in the lengthwise direction of the vehicle are referred to as the YZ planes. Assuming this, the line of action of the spring force running skewed to the center line of the shock absorber means that the line of action of the spring force runs slanted to the projection of the spring center line on the XZ plane and also on the YZ plane. Projection of the spring center line refers to the projection of the spring center line of the installed helical compression spring. Because the line of action of the spring force runs slanted to the projection of the spring center line on the XZ plane, the reaction forces which occur on the shock absorber or on the piston rod of the shock absorber are reduced. Additionally, the line of action of the spring force running slanted to the projection of the spring center line on the YZ plane reduces or eliminates the forces which result from the difference between the components of the helical compression spring forces acting in the direction of travel on the left side of the vehicle and the right side of the vehicle. The forces which occur due to the line of action of the spring force running roughly slanted to the projection of the spring center line on the YZ plane compensate at least partially for the undesirable destabilizing forces described above which are otherwise delivered to the steering mechanism, and therefore the driving of the vehicle in a straight line is improved or ensured.

DETAILED DESCRIPTION OF THE INVENTION

Figure 1:
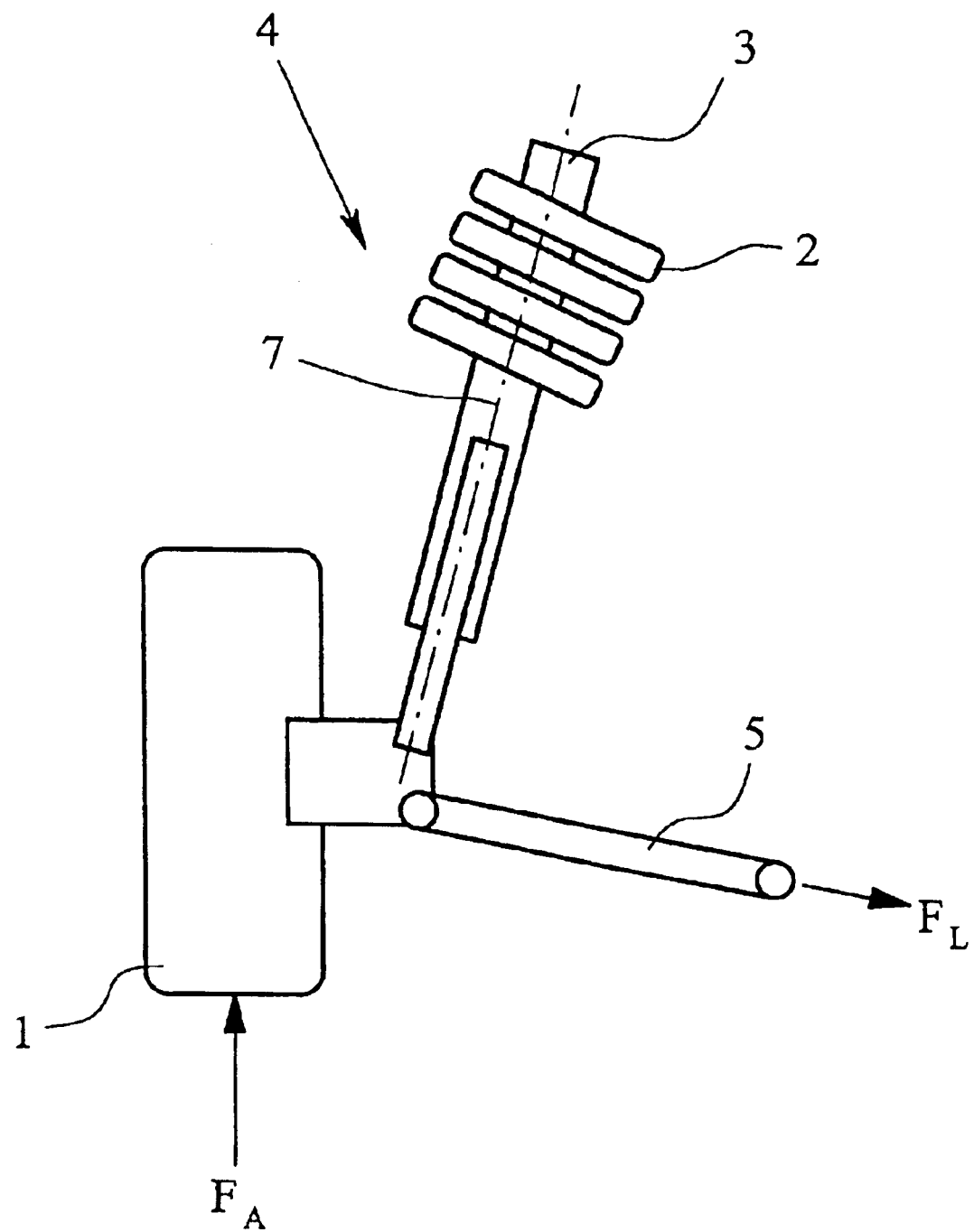
FIG. 1 shows a schematic of the wheel suspension of the present invention, viewed in the lengthwise direction of the vehicle.
Figure 2:
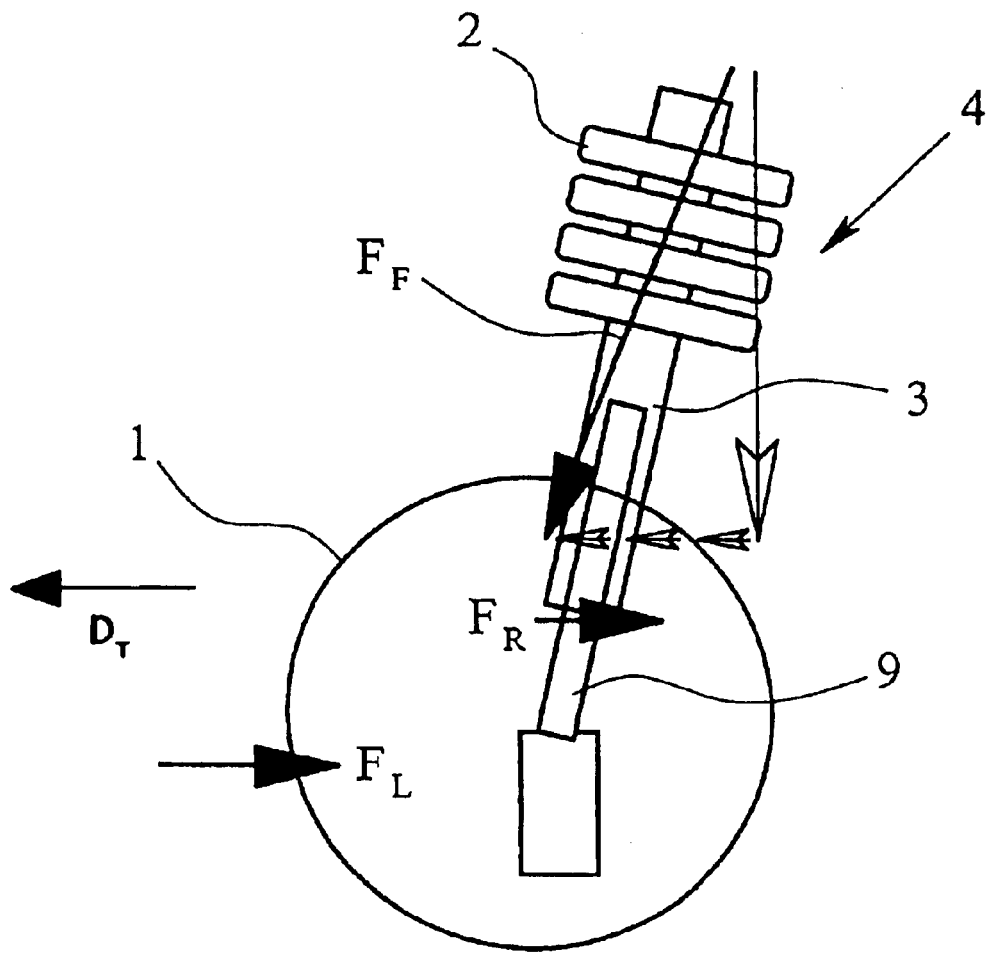
FIG. 2 shows a schematic of the wheel suspension of the present invention, viewed perpendicular to the lengthwise direction of the vehicle, therefore from one side of the vehicle.

The wheel suspension shown in FIGS. 1 and 2 includes a strut 4 which includes a helical compression spring 2, a spring body, and a shock absorber 3 and which is connected on the one hand to the body, which is not shown, and on the other to the wheel 1 and a suspension arm 5.

FIGS. 1 and 2 show the forces acting in the system under consideration here, specifically a) the wheel rise force $F_A$ which runs in the direction perpendicular to the plane of the wheel rise, b) the force $F_L$ of the transversal swinging arm, which force runs in the plane of the suspension arm 5 and through the lower bearing point or suspension, and c) the helical compression spring force $F_F$ which should lie in the main loading plane, which is determined by the upper bearing point, the lower bearing point, and the wheel rise point.

If the helical compression spring force $F_F$ is not in the main loading plane, a reaction force $F_R$ forms opposite the direction of travel, $D_T$. If the suspension arm 5 were perfectly rigid, a component of the helical compression spring force $F_F$ acting in the direction of travel (as shown in FIG. 2 by three small open arrowheads) would be captured by the suspension arm 5. However, the wheel suspension is completely elastic and the suspension arm 5 and the steering mechanism, which is not shown, in particular are deformable. The component of the helical compression spring force $F_F$ acting in the direction of travel, and thus the reaction force $F_R$, are therefore captured only partially by the suspension arm 5; both partially act on the steering mechanism.

In the present invention, provisions are made for the force which is delivered to the steering mechanism and which results from the difference of the components of the helical compression spring forces $F_F$ acting in the direction of travel, therefore the reaction forces $F_R$, on the left and right sides of the vehicle are reduced or minimized by the helical compression spring 2 which is made such that the line 6 of action of the spring force runs skewed to the center line 7 of the shock absorber.

If the planes which run perpendicular to the lengthwise direction of the vehicle are labeled the XZ planes and the planes which run in the lengthwise direction of the vehicle are labeled the YZ planes, the line 6 of action of the spring force running skewed to the center line 7 of the shock absorber is slanted to the projection of the spring center line 8 on the XZ plane and the YZ plane. Because the line 6 of action of the spring force runs skewed to the projection of the spring center line 8 on the XZ plane, the reaction forces $F_R$ which occur otherwise on the shock absorber 3 or on the piston rod 9 of the shock absorber 3 are reduced. Similarly, the line 6 of action of the spring force running slanted to the projection of the spring center line 8 on the YZ plane reduces or minimizes or eliminates the forces which result from the difference between the components of the helical compression spring forces $F_F$ acting in the direction of travel on the left side of the vehicle and the right side of the vehicle. Driving the vehicle in a straight line is improved or ensured because the forces which occur due to the line 6 of action of the spring force running roughly slanted to the projection of the spring center line 8 on the YZ plane compensate at least partially for the undesirable destabilizing forces, which are otherwise delivered to the steering mechanism, resulting from the difference between the components of the helical compression spring forces $F_F$ acting in the direction of travel, and thus the reaction forces $F_R$, on the left and right sides of the vehicle.

Figure 3:
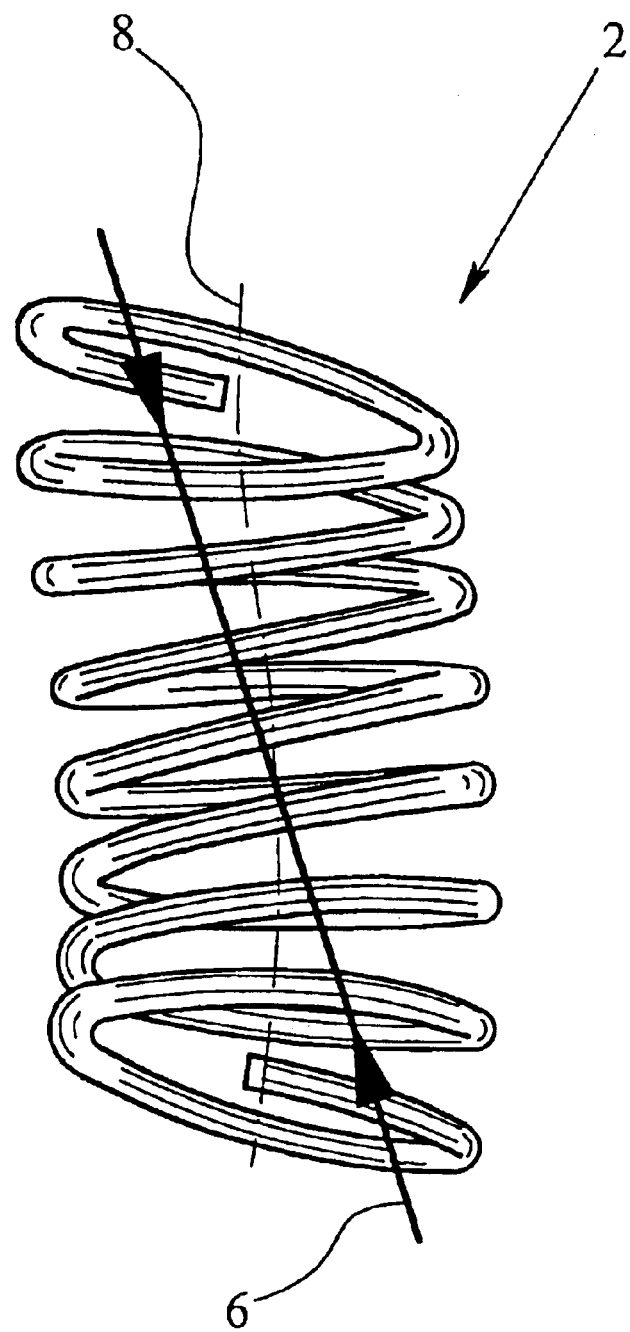
FIG. 3 shows one view of a helical compression spring which belongs to the wheel suspension of the present invention, viewed in the lengthwise direction of the vehicle.
Figure 4:
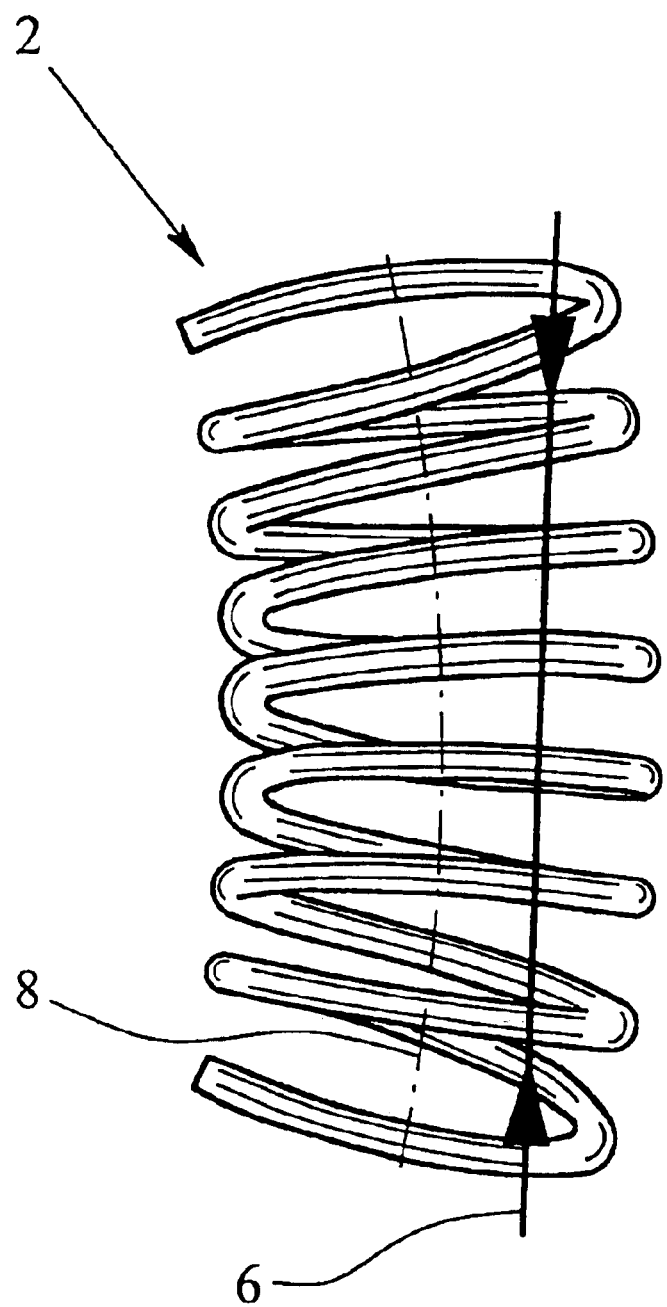
FIG. 4 shows a view of the helical compression spring as shown in FIG. 3, viewed perpendicular to the lengthwise direction of the vehicle, therefore from one side of the vehicle.

In one preferred embodiment as shown in FIGS. 3 and 4, the spring center line 8 of the helical compression spring 2 in the unloaded state is roughly or generally S-shaped from one perspective and C-shaped from another perspective such that the line 6 of action of the spring force runs slanted to the projection of the spring center line 8 on both the XZ and YZ planes. Because the spring center line 8 of the helical compression spring 2 in the unloaded state is roughly or generally S-shaped and the line 6 of action of the spring force runs slanted to the projection of the spring center line 8 on the XZ plane, the transverse forces which occur otherwise on the shock absorber 3 or on the piston rod 9 of the shock absorber 3 are reduced. Additionally, because the spring center line 8 of the helical compression spring 2 in the unloaded state is also roughly or generally C-shaped and the line 6 of action of the spring force runs slanted to the projection of the spring center line 8 on the YZ plane, the forces which otherwise occur and which result from the difference between the components of the helical compression spring forces $F_F$ acting in the direction of travel, therefore the reaction forces $F_R$, on the left and right sides of the vehicle are reduced or minimized of eliminated.

It was stated initially that in the wheel suspension under consideration, the helical compression spring 2 is preferably configured to compensate at least partially for the reaction forces on the shock absorber 3. In one embodiment, the helical compression spring 2 is made such that the spring center line 8 in the unloaded state is roughly S-shaped. Thus, in the described embodiment, the teaching which follows from German patent 37 43 450 and U.S. Pat. No. 4,903,985 is implemented. Instead of the measure "the spring center line 8 of the helical compression spring 2 running in an S shape" or in addition thereto, measures can also be made which attempt to implement the transverse force compensation under consideration, for which reference is made in the prior art.

In this embodiment, the spring center line 8 of the helical compression spring 2, as is shown in FIG. 4, also runs roughly or generally in a C shape, by which the force which is delivered to the steering mechanism and which results from the difference between the components of the helical compression spring forces $F_F$ acting in the direction of travel, and thus the reaction forces $F_R$, on the left and right sides of the vehicle are reduced or minimized or eliminated. Instead of making the helical compression spring 2 such that the spring center line 8 in the unloaded state runs roughly in a C shape, in this respect a helical compression spring 2 can also be used with a spring center line in the unloaded state which runs roughly in a S shape.

The subject matter of the invention is not only the wheel suspension of the invention described above, but it is also a specially made helical compression spring for use in the wheel suspension of the present invention.

We claim:

1. A wheel suspension for a vehicle, comprising:
   a spring strut which is connected to a body of the vehicle and to a wheel of the vehicle comprising:
      a helical compression spring,
      a shock absorber; and
      a transverse control arm;
   wherein said helical compression spring is shaped so as to compensate for a reaction force which would otherwise occur at the shock absorber without the helical compression spring and said helical compression spring being shaped to have a line of action that is skewed relative to the center line of the shock absorber, said helical compression spring shape, in an unloaded state, having a center line that is generally S-shaped in one plane and is generally C-shaped in another plane.

2. A wheel suspension for a vehicle, comprising:
   a spring strut which is connected to a body of the vehicle and to a wheel of the vehicle comprising:
      a helical compression spring,
      a shock absorber; and
      a transverse control arm;
   wherein said helical compression spring is shaped to have a line of action that is skewed relative to the center line of the shock absorber, said helical compression spring shape, in an unloaded state, having a center line that is generally S-shaped in one plane and generally C-shaped in another plane.

* * * * *